United States Patent [19]
Wilhite et al.

[11] Patent Number: 6,129,582
[45] Date of Patent: *Oct. 10, 2000

[54] ELECTRICAL CONNECTOR FOR TELEPHONE HANDSET

[75] Inventors: Matthew Wilhite, Limerick; William Gordon Fogarty, Belfast, both of Ireland

[73] Assignee: Molex Incorporated, Lisle, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/943,843

[22] Filed: Oct. 3, 1997

[30] Foreign Application Priority Data

Nov. 4, 1996 [EP] European Pat. Off. ............. 96117609

[51] Int. Cl.[7] .................................................. H01R 3/00
[52] U.S. Cl. ........................................ 439/500; 439/620
[58] Field of Search ................................... 430/500, 620

[56] References Cited

U.S. PATENT DOCUMENTS

| | | | |
|---|---|---|---|
| 4,295,009 | 10/1981 | Weidler | 198/583 |
| 4,578,545 | 3/1986 | Phillipson | 179/178 |
| 4,965,483 | 10/1990 | Abe et al. | 310/324 |
| 5,054,115 | 10/1991 | Sawa et al. | 455/89 |
| 5,313,514 | 5/1994 | Kanasashi | 379/58 |
| 5,538,435 | 7/1996 | Yohn | 439/188 |
| 5,548,644 | 8/1996 | Boehnke et al. | 379/433 |
| 5,761,299 | 6/1998 | Patterson et al. | 379/433 |
| 5,830,007 | 11/1998 | Fry et al. | 439/500 |
| 5,836,790 | 11/1998 | Barnett | 439/620 |

*Primary Examiner*—Steven L. Stephan
*Assistant Examiner*—T C Patel
*Attorney, Agent, or Firm*—Stephen Z. Weiss

[57] ABSTRACT

An electrical connector is provided for use in a telephone handset. The connector includes a dielectric housing having opposite ends and an array of terminal-receiving cavities between the ends. A receptacle is formed in the housing outside the array of terminal-receiving cavities for receiving a microphone. A plurality of signal terminals disposed in the cavities. A plurality of microphone terminals are mounted on the housing, with spring arms located in slots in the bottom wall, and project into the receptacle for engaging appropriate contacts on the microphone. An acoustic channel extends through the housing to communicate the receptacle with the environment outside the housing.

9 Claims, 4 Drawing Sheets

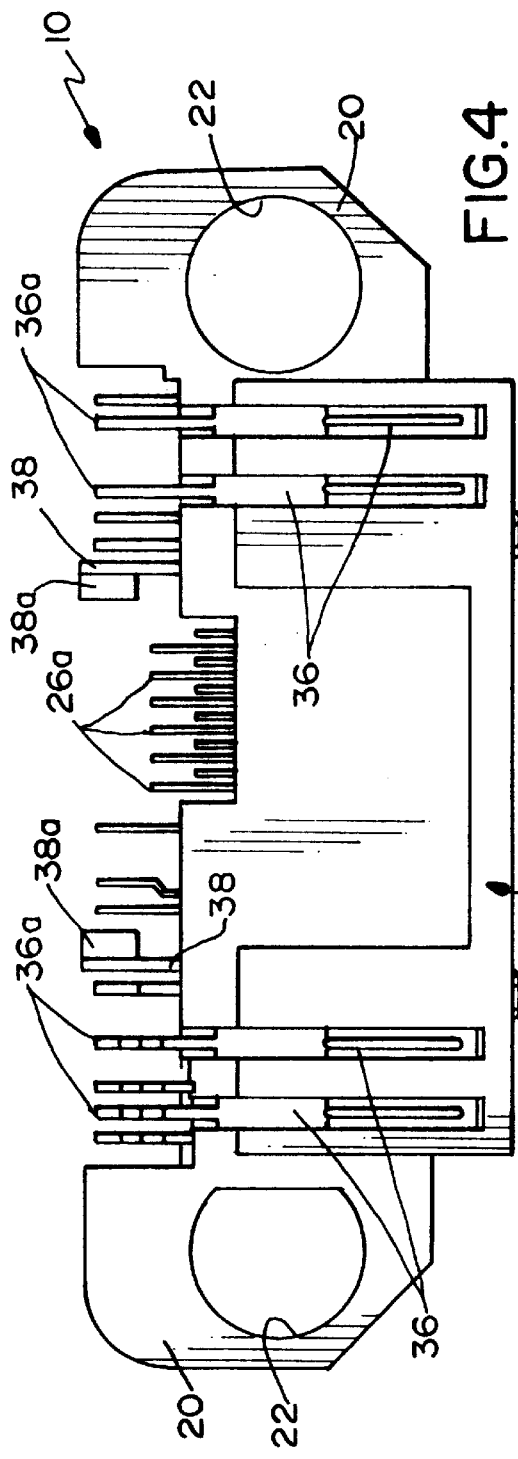
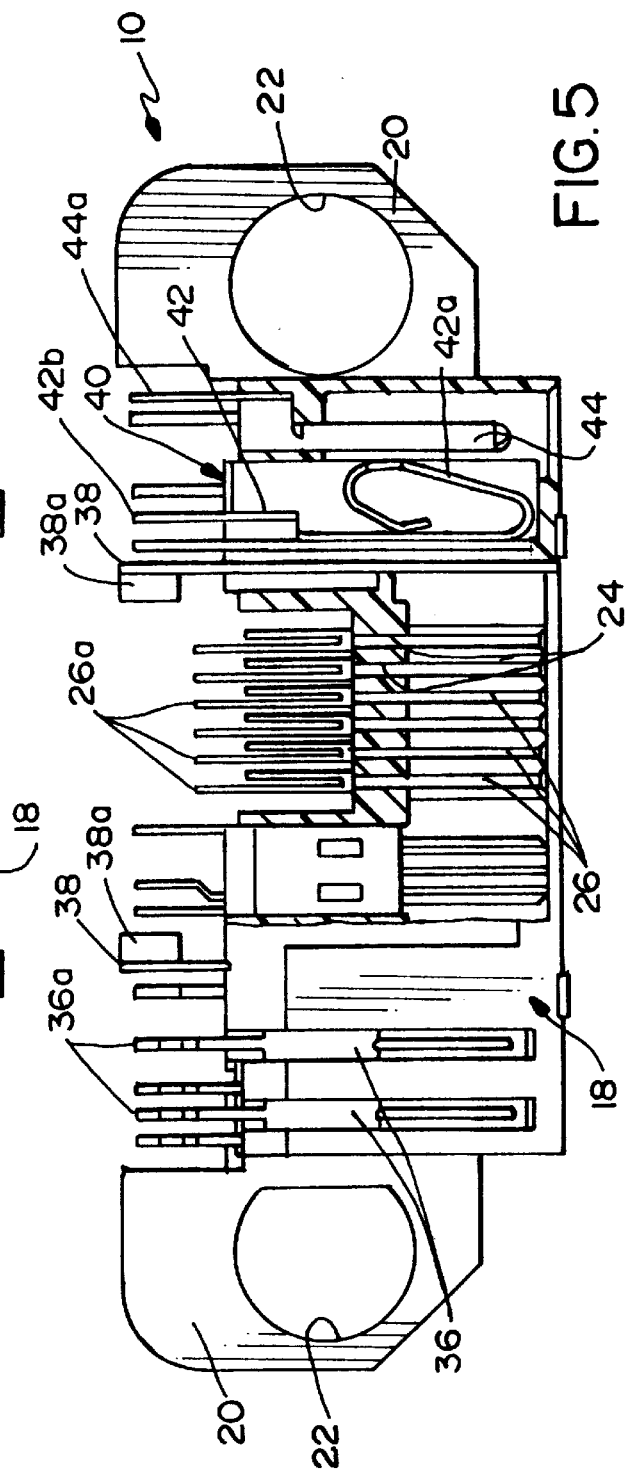

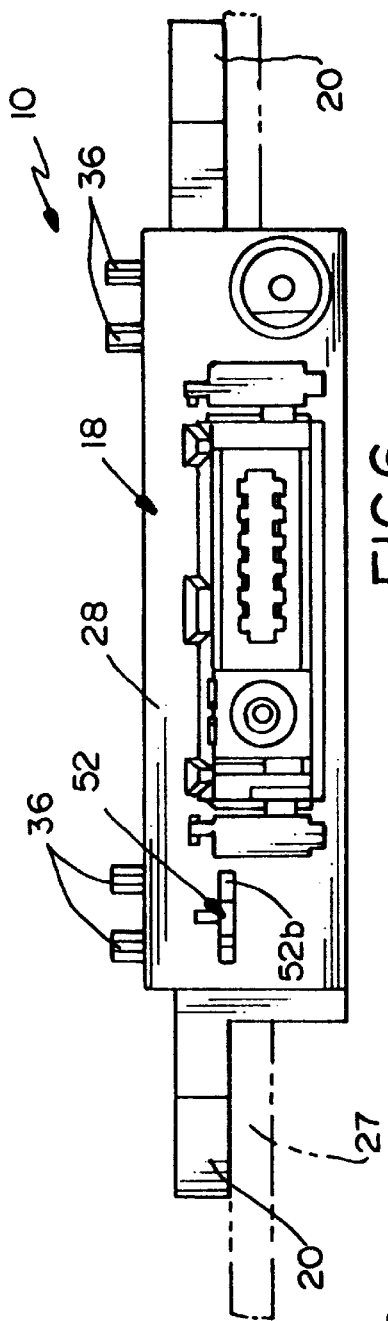
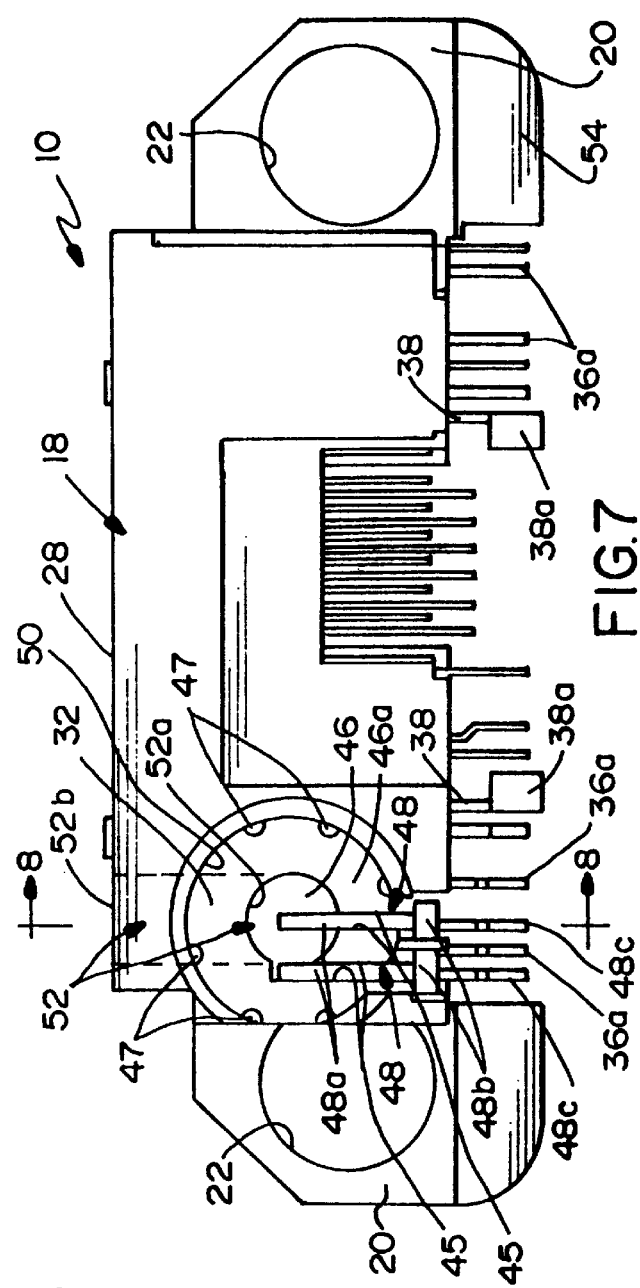
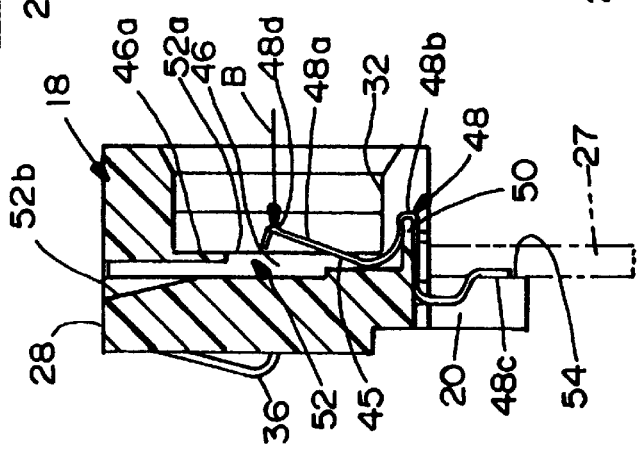

ELECTRICAL CONNECTOR FOR TELEPHONE HANDSET

FIELD OF THE INVENTION

This invention generally relates to the art of electrical connectors and, particularly, to an electrical connector for use in a telephone handset or the like and, still further, the invention is directed to incorporating a microphone into the connector itself.

BACKGROUND OF THE INVENTION

Telephone handsets, particularly for use in portable or mobile telephone systems, include an extraordinary number of components in a relatively confined space. The handset includes a microphone unit, a speaker unit, a dialing system, antenna components, various circuitry including suppressing circuits, and a variety of related interconnecting components. The handset also may include a DC receptacle and, if the handset is in a portable or mobile system, battery and battery charging circuits. Connectors may be needed for any or all of these components and systems. It readily can be understood that this is a relatively large number of components, systems and connectors to be incorporated into a relatively small apparatus. Yet, there is an ever-increasing desire to further miniaturize telephone handsets, particularly mobile telephone handsets, and this creates considerable design problems due to extremely limited space availability.

The invention herein addresses one of those problems and, particularly, in making accommodation for the microphone of the telephone handset. Typically, the microphone is part of its own unit, including its electrical connector and an arrangement to mount the microphone in proximity to a small circuit board within the handset. In other words, the microphone requires its own "real estate" within the overall handset apparatus.

A typical telephone handset, on the other hand, has a main connector which includes various components such as the signal terminals, battery terminals, DC plug terminals, circuit boardlocks and the like. The present invention contemplates mounting the microphone and its respective terminals also on the main connector to save considerable space within the handset unit and still allow the microphone to be acoustically acceptable.

SUMMARY OF THE INVENTION

An object, therefore, of the invention is to provide a new and improved electrical connector design for use in a telephone handset or the like.

In the exemplary embodiment of the invention, the connector includes an elongated, one-piece dielectric housing having opposite ends and an array of terminal-receiving cavities between the ends. A receptacle is formed in the housing outside the array of terminal-receiving cavities for receiving a microphone. A plurality of signal terminals are disposed in the cavities. A plurality of microphone terminals are mounted on the housing with spring arms located in slots in the receptacle bottom wall and project into the receptacle for engaging appropriate contacts on the microphone.

The invention contemplates the provision of an acoustic channel extending through the housing to communicate the receptacle with the environment outside the housing. The receptacle is formed by a generally cylindrical cavity, with the acoustic channel extending through the housing between a bottom of the receptacle cavity and a side wall of the housing. A plurality of inwardly directed protrusions are spaced about the cylindrical cavity for establishing an interference fit with the microphone.

As disclosed herein, a plurality of battery terminals are mounted on the housing and are adapted for engaging a battery in a mobile phone system. A plurality of ground terminals are mounted on the housing and are adapted for engaging appropriate ground traces on a printed circuit board.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 4 is a bottom plan view of the connector;

FIG. 5 is a bottom plan view similar to that of FIG. 4, with portions of the housing cut-away to show various interior components thereof;

FIG. 6 is an elevational view looking toward the mating face of the connector;

FIG. 7 is a top plan view of the connector; and

FIG. 8 is a vertical section taken generally line 8—8 of FIG. 7.

DETAILED DESCRIPTION OF THE PREFERRED EMBODIMENT

Figure 1:
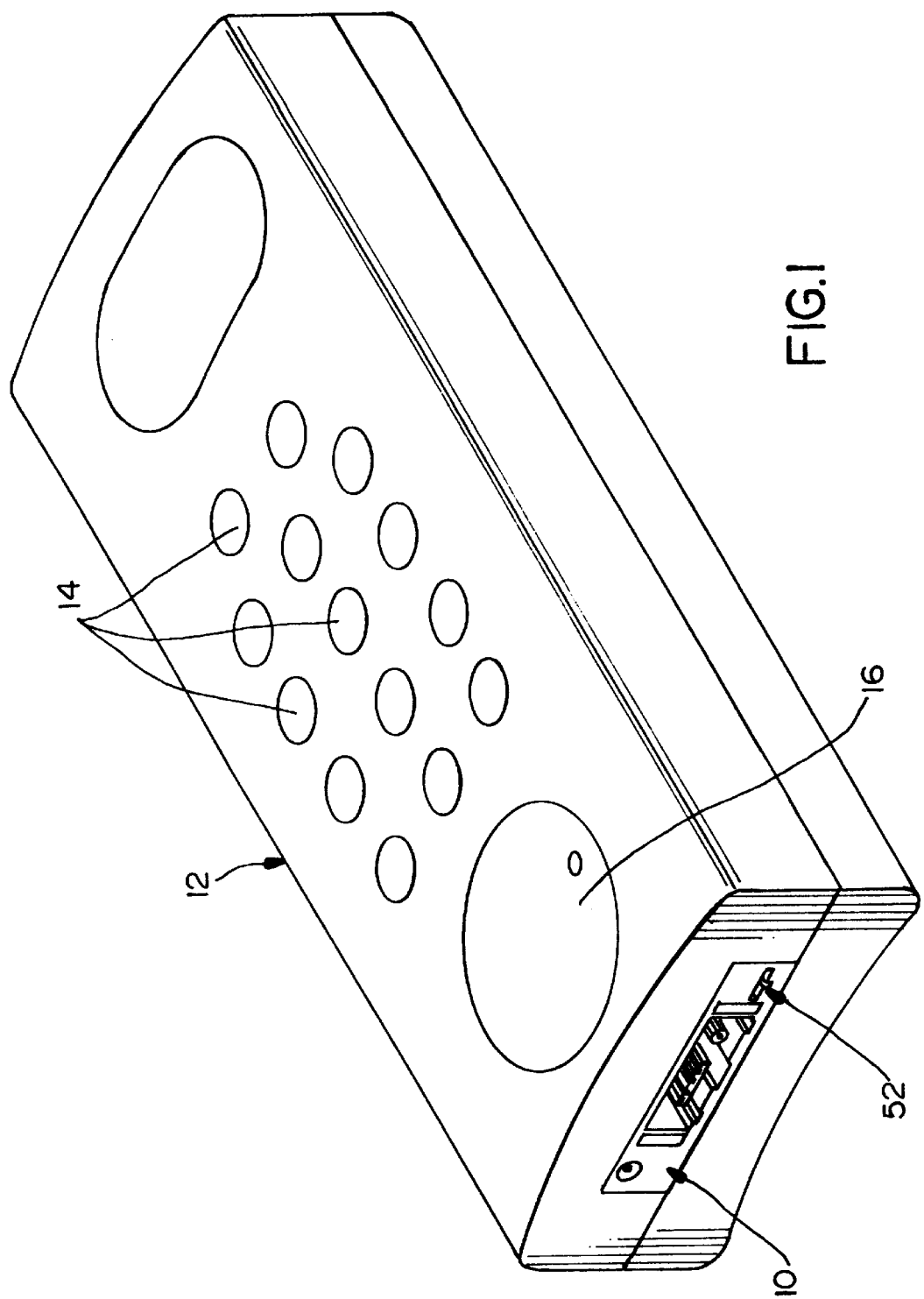
FIG. 1 is a perspective view of a mobile telephone handset incorporating the electrical connector of the invention.

Referring to the drawings in greater detail, and first to FIG. 1, the invention is embodied in an electrical connector, generally designated 10, mounted in the bottom end of a telephone handset, generally designated 12. The handset is shown of a typical configuration and includes appropriate dialing buttons 14 and a microphone channel 16.

Figure 2:
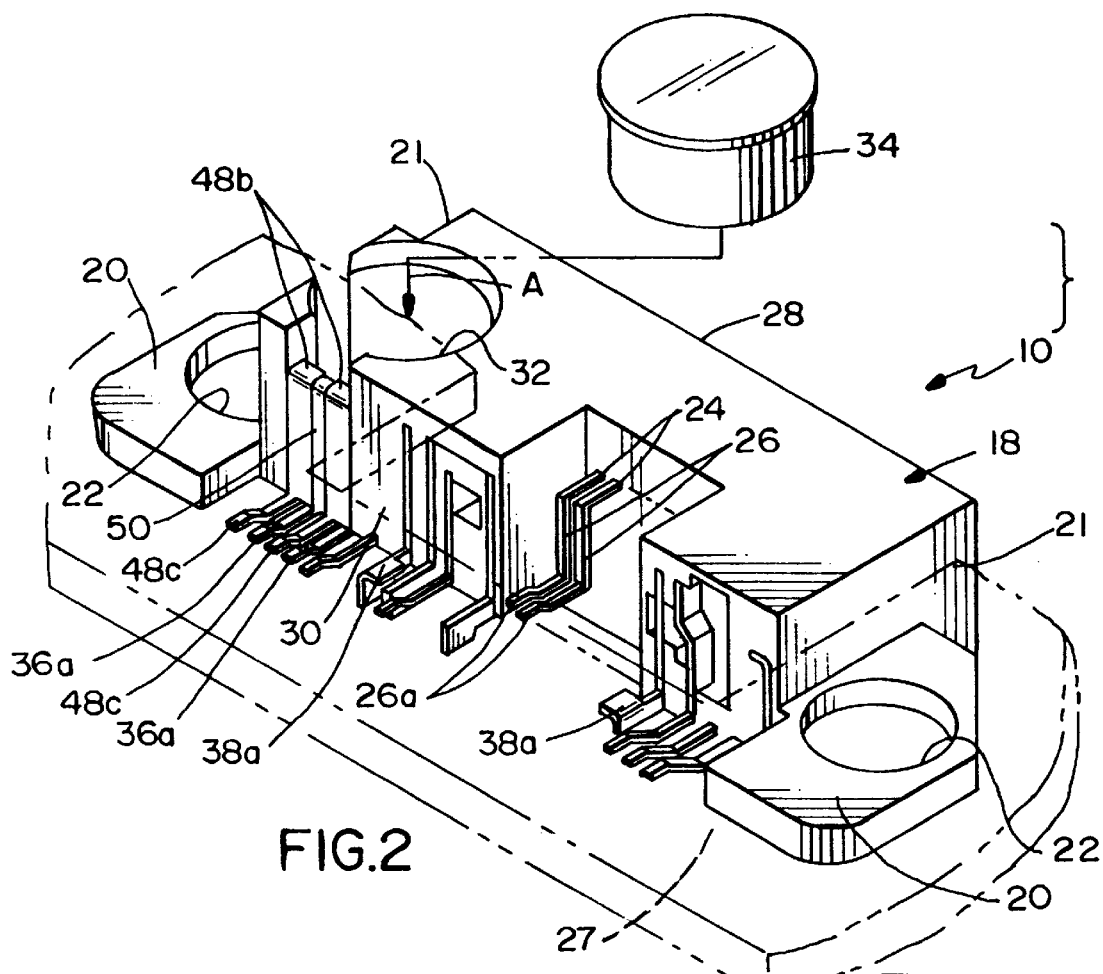
FIG. 2 is a perspective view of the connector, looking toward its terminating face, and with the microphone removed.
Figure 3:
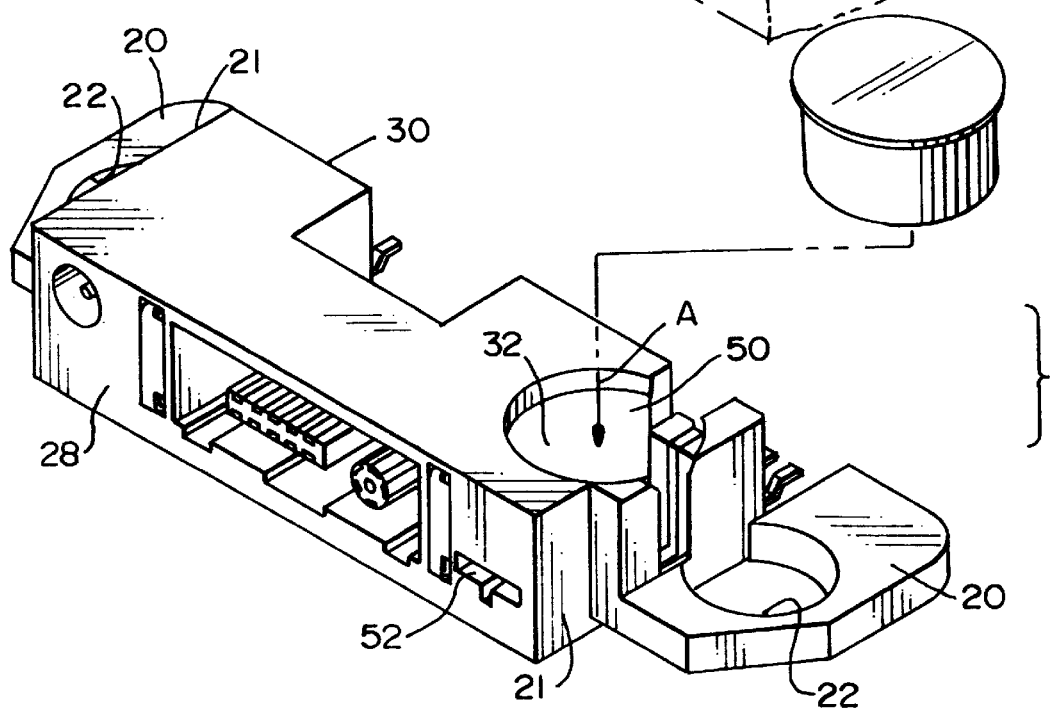
FIG. 3 is a perspective view of the connector, looking toward its mating face, and with the microphone removed.

Referring to FIGS. 2 and 3, electrical connector 10 includes an elongate, one-piece dielectric housing, generally designated 18. The housing is unitarily molded of plastic material and includes a pair of opposite ends 21 defined by wings 20 having appropriate mounting apertures 22 therein. The housing includes an array of terminal-receiving cavities 24 between opposite ends 21, and a plurality of signal terminals 26 are disposed in the cavities. The signal terminals have tail portions 26a adapted for engaging appropriate circuit traces on a printed circuit board 27. In essence, the housing defines a mating face 28 and a terminating face 30, the faces extending between opposite ends 21. Lastly, unitary or one-piece housing 18 includes a receptacle defined by a generally cylindrical cavity 32 for receiving a microphone 34 inserted into the receptacle in the direction of arrow "A". The microphone is circular or disk-shaped.

Referring to FIGS. 4 and 5, a pair of battery terminals 36 are mounted on housing 18 near each opposite end 21 of the housing. It can be seen that each pair of battery terminals is located between one of the ends 21 of the housing and the more central array of signal terminals 26. The battery terminals have tail portions 36a adapted for engaging appropriate circuit traces on the printed circuit board.

FIGS. 4 and 5 also show that housing 18 mounts a pair of boardlocks 38, with each boardlock including a pad portion 38a for soldering to a pad on the printed circuit board. One of the boardlocks is located between each opposite end 20 of the housing and the more central array of signal terminals 26.

FIG. 5 shows that housing 18 further mounts a DC receptacle unit, generally designated 40. The DC receptacle unit includes a DC contact beam 42 having a contact portion 42a, along with a DC pin 44. The beam has a tail portion 42b and the pin has a tail portion 44a for soldering to appropriate circuit traces on the printed circuit board 27 (not shown in this Figure).

FIG. 6 shows how battery terminals 36 project from housing 18 for engaging appropriate complementary charging terminals in the base unit (not shown) for the handset. FIG. 8 shows how the battery terminals 36 are bowed outwardly from the housing. The terminals are resilient and are biased against the charging terminals in the base unit when handset 12 (FIG. 1) is disposed in the base unit.

FIGS. 7 and 8 best show the configuration of receptacle 32 for receiving microphone 34. In essence, the receptacle comprises a generally cylindrical cavity having a circuferential wall 50 and a bottom wall 46 with a ring-shaped partion 46a raised above the bottom wall 46.

A plurality of inwardly directed protrusions 47 are spaced about cylindrical receptacle or cavity 32 for establishing an interference fit with microphone 34. A pair of microphone terminals, generally designated 48, are mounted on housing 18. The terminals have spring arm contacts 48a projecting into receptacle 32. FIG. 8 shows how the spring arm contacts 48a are cantilevered upwardly into receptacle 32, whereby the spring arm contacts will be biased downwardly or inwardly in the direction of arrow "B" when microphone 34 (FIGS. 2 and 3) is inserted into the receptacle, with appropriate contacts on the microphone biasingly engaging spring arm contacts 48a in the direction of arrow "B". When microphone 34 is fully inserted onto the receptacle, the entire spring arm 48a, with the exception of contact point 48d, will fit within slot 45 in the ring-shaped raised portion 46a of the bottom wall 46. The microphone contacts 48 have generally U-shaped body portions 48b press fit over portions of the circumferential wall 50 of housing 18 to mount the contacts onto the housing. The microphone contacts also have tail portions 48c projecting outwardly from the housing for engaging appropriate circuit traces on the printed circuit board. With contacts 48 being inserted into the receptacle and with the spring arms 48a being located within a slot 45 in the raised portion 46a of the lower receptacle wall 46, the sound will be sealed within the microphone receptacle and improve the efficiency of the microphone 34.

Referring particularly to FIGS. 6–8, the invention contemplates the provision of an acoustic channel, generally designated 52, which extends through housing 18 to communicate microphone receptacle 32 with the environment outside the housing. The acoustic channel provides better fidelity for the microphone by providing a low impedance wave guide path through the housing between the microphone and the environment outside the housing. The acoustic channel provides an equal attenuating medium on opposite sides of the disk-shaped microphone. More particularly, acoustic channel 52 has a circular inner mouth 52a at one end thereof in bottom wall 46 of receptacle 32. The acoustic channel has a T-shaped outer mouth 52b that opens in side wall or mating face 28 of housing 18. The acoustic channel is open between inner mouth 52a and outer mouth 52b as seen clearly in FIG. 8.

Lastly, FIGS. 7 and 8 show how ends or wings 20 of housing 18 project longitudinally outwardly (FIG. 7) and transversely outwardly (FIG. 8) of the body of housing 20 to define a shelf 54 for surface mounting at the edge of the printed circuit board. Therefore, tail portions 26a of signal terminals 26, tail portions 36a of battery terminals 36, pads 38a of boardlocks or ground terminals 38, tail portions 42b and 44a of DC plug 40 and tail portions 48c of microphone terminals 48 all are generally coplanar along shelf 54 for engaging appropriate circuit traces or pads on one side the pointed circuit board.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An electrical connector for use in a telephone handset for mounting a microphone in the telephone handset, for coupling the microphone to a printed circuit board in the telephone handset and for providing an external connection for the telephone handset, said electrical connector comprising:

a dielectric housing including a receptacle for receiving said microphone;

the receptacle comprising a generally cylindrical cavity defined in part by a circumferential wall and a bottom wall with a raised ring-shaped portion with slots;

a plurality of coupling terminals mounted on the housing for providing said external connection; and a plurality of microphone terminals mounted on said housing with respect to said receptacle, each of said microphone terminals having a spring arm adapted to fit within one of the slots in the raised ring-shaped portion of the bottom wall, a contact portion projecting into the receptacle for engaging an appropriate contact on the microphone, and a mounting portion mounted on a portion of the circumferential wall of the housing, said mounting portion comprising a U-shaped body portion press fit over a portion of said circumferential wall and extending over a top rim portion of said circumferential wall.

2. The electrical connector of claim 1 including an acoustic channel extending through said housing between said bottom wall of said receptacle and a mating face of said housing.

3. The electrical connector of claim 1, including a plurality of inwardly directed protrusions spaced about the cylindrical cavity and being formed from said circumferential wall so as to extend from the circumferential wall and against the side of said microphone for maintaining said microphone in said cavity.

4. The electrical connector of claim 1, wherein said plurality of coupling terminals includes a plurality of battery terminals mounted on the housing and adapted for engaging a battery in a mobile phone system.

5. The electrical connector of claim 1, wherein said plurality of coupling terminals includes a plurality of ground terminals mounted on the housing and adapted for engaging appropriate ground traces on said printed circuit board.

6. The electrical connector of claim 1, wherein said electrical connector is adapted to be mounted on said printed circuit board in said telephone handset and each of said plurality of microphone terminals has a tail portion extending from said mounting portion for coupling said microphone terminal to a circuit on said printed circuit board.

7. An electrical connector for use in a telephone handset for mounting a microphone in the telephone handset, for coupling the microphone to a printed circuit board in the telephone handset and for providing an external connection for the telephone handset, said electrical connector comprising:

a dielectric housing including a receptacle for receiving said microphone;

the receptacle comprising a generally cylindrical cavity defined in part by a circumferential wall extending around at least a portion of said cavity, said circumferential wall having an internal wall surface, a top rim along at least a portion of said circumferential wall and an outer wall surface;

a plurality of coupling terminals mounted on the housing for providing said external connection; and a plurality of microphone terminals mounted on said housing with respect to said receptacle, each of said microphone terminals having a spring arm with a contact portion projecting into the receptacle for engaging an appropriate contact on the microphone, and a mounting portion mounted on a portion of the circumferential wall of the housing, said mounting portion comprising a generally U-shaped body portion secured over a portion of said circumferential wall such that a leg portion of said U-shaped body portion extends along said internal wall surface, a bight portion of said U-shaped portion extends about said top rim and another leg portion of said U-shaped portion extends along said outer wall surface.

8. The electrical connector of claim 7, wherein said electrical connector is adapted to be mounted on said printed circuit board in said telephone handset and each of said plurality of microphone terminals has a tail portion extending from said mounting portion for coupling said microphone terminal to a circuit on said printed circuit board.

9. The electrical connector of claim 7, wherein said receptacle further includes a bottom wall with a raised ring-shaped portion with slots and wherein said spring arm of each of said microphone terminals being adapted to fit within one of the slots in the raised ring-shaped portion of said bottom wall.

\* \* \* \* \*